(12) United States Patent
Aoki et al.

(10) Patent No.: US 10,071,629 B2
(45) Date of Patent: Sep. 11, 2018

(54) PRIME MOVER CONTROL DEVICE OF WORK VEHICLE

(71) Applicant: KCM Corporation, Kako-gun, Hyogo (JP)

(72) Inventors: Isamu Aoki, Tsuchiura (JP); Koji Hyodo, Tsuchiura (JP); Tetsuji Tanaka, Tsuchiura (JP); Masaki Nukii, Tsuchiura (JP)

(73) Assignee: KCM Corporation, Hyogo (JP)

( * ) Notice: Subject to any disclaimer, the term of this patent is extended or adjusted under 35 U.S.C. 154(b) by 0 days.

(21) Appl. No.: 15/508,554

(22) PCT Filed: Nov. 30, 2015

(86) PCT No.: PCT/JP2015/083558
§ 371 (c)(1),
(2) Date: Mar. 3, 2017

(87) PCT Pub. No.: WO2016/084974
PCT Pub. Date: Jun. 2, 2016

(65) Prior Publication Data
US 2017/0274770 A1    Sep. 28, 2017

(30) Foreign Application Priority Data

Nov. 28, 2014 (JP) ................................ 2014-241570

(51) Int. Cl.
*F02D 41/02* (2006.01)
*B60K 31/04* (2006.01)
(Continued)

(52) U.S. Cl.
CPC .......... *B60K 31/045* (2013.01); *B60K 31/047* (2013.01); *B60W 10/06* (2013.01);
(Continued)

(58) Field of Classification Search
CPC ......... F02D 41/0225; F02D 2200/1002; F02D 2200/501; F02D 2250/26; B60W 2510/0638
See application file for complete search history.

(56) References Cited

U.S. PATENT DOCUMENTS

2002/0183163 A1\* 12/2002 Etchason ............. F02D 41/022
                                                          477/110
2010/0262353 A1    10/2010 Hyodo et al.
(Continued)

FOREIGN PATENT DOCUMENTS

JP        2011-2049 A      1/2011
WO    WO 2009/054499 A1    4/2009

OTHER PUBLICATIONS

International Search Report (PCT/ISA/210) issued in PCT Application No. PCT/JP2015/083558 dated Feb. 16, 2016 with English translation (four pages).
(Continued)

*Primary Examiner* — Erick Solis
(74) *Attorney, Agent, or Firm* — Crowell & Moring LLP

(57) ABSTRACT

A prime mover control device of a work vehicle equipped with a torque converter includes: a speed ratio calculation unit that calculates a speed ratio of the torque converter; and a rotational speed limit unit that, when a speed ratio falls within a preset speed ratio range, limits a maximum rotational speed of the prime mover to be lower as compared with a maximum rotational speed set when a speed ratio falls without the preset speed ratio range. When a state in which the speed ratio calculated by the speed ratio calculation unit falls within the preset speed ratio range is maintained for a predetermined time period, the rotational speed limit unit changes a maximum rotational speed of the prime mover to a higher maximum rotational speed than the limited maxi-
(Continued)

mum rotational speed limited to be lower by the rotational speed limit unit.

4 Claims, 9 Drawing Sheets

(51) Int. Cl.
    *B60W 10/06*     (2006.01)
    *B60W 10/10*     (2012.01)
    *F02D 41/04*     (2006.01)

(52) U.S. Cl.
    CPC ......... *B60W 10/10* (2013.01); *F02D 41/0225* (2013.01); *F02D 41/042* (2013.01); *B60W 2510/0638* (2013.01); *B60W 2710/0666* (2013.01); *F01P 2023/08* (2013.01); *F02D 2200/1002* (2013.01); *F02D 2200/501* (2013.01); *F02D 2250/16* (2013.01); *F02D 2250/26* (2013.01)

(56) References Cited

U.S. PATENT DOCUMENTS

| | | | |
|---|---|---|---|
| 2012/0059560 A1* | 3/2012 | Balton | B60W 30/18136 701/54 |
| 2012/0095655 A1 | 4/2012 | Hyodo et al. | |
| 2013/0110361 A1* | 5/2013 | Steeby | B60W 10/06 701/54 |
| 2016/0003355 A1* | 1/2016 | Nishida | F01P 3/20 477/107 |

OTHER PUBLICATIONS

Japanese-language Written Opinion (PCT/ISA/237) issued in PCT Application No. PCT/JP2015/083558 dated Feb. 16, 2016 (three pages).

* cited by examiner

MODE A

MODE B

MODE C

CORRELATION OF EACH MODE

PRIME MOVER CONTROL DEVICE OF WORK VEHICLE

TECHNICAL FIELD

The present invention relates to a prime mover control device used in a work vehicle.

BACKGROUND

A device that limits the engine rotational speed for a reduction in fuel consumption is known as being used in a work vehicle equipped with an engine and a torque converter. An engine rotational speed limiter disclosed in Patent Literature 1 has a state in which the engine speed is significantly limited and a state in which the limit is relaxed, and the engine speed limiter is switched between the two states based on predetermined requirements.

CITATION LIST

Patent Literature

Patent Literature 1: JP 2011-2049 A

SUMMARY OF INVENTION

Technical Problem

In the invention disclosed in Patent Literature 1, since there is only one state for the relaxing of the limit of the maximum engine speed, it is difficult to set a maximum engine speed suitable for a traveling load.

Solution To Problem

According to a first aspect of the present invention, a prime mover control device of a work vehicle is a prime mover control device of a work vehicle for transferring rotation of a prime mover through a torque converter and a transmission to wheels. The prime mover control device includes: a rotational speed control unit that controls a rotational speed of the prime mover in accordance with the manipulated variable of an accelerator pedal; a speed ratio calculation unit that calculates a speed ratio between an input shaft and an output shaft of the torque converter; and a rotational speed limit unit that, when a speed ratio calculated by the speed ratio calculation unit falls within a preset speed ratio range, limits a maximum rotational speed of the prime mover to be lower as compared with maximum rotational speeds set when a speed ratio falls within a range higher than the preset speed ratio range and when a speed ratio falls within a range lower than the preset speed ratio range. When the speed ratio calculated by the speed ratio calculation unit is maintained for a predetermined time in a state within the preset speed ration range, the rotational speed limit unit changes a maximum rotational speed of the prime mover to a higher maximum rotational speed than the limited maximum rotational speed limited to be lower by the rotational speed limit unit.

Advantageous Effects of Invention

According to the present invention, the setting of a maximum engine rotational speed suitable for a traveling load is enabled.

DESCRIPTION OF EMBODIMENTS

One embodiment of a prime mover control device of a work vehicle in accordance with the present invention will be described below with reference to FIG. 1 to FIG. 7.

Figure 1:
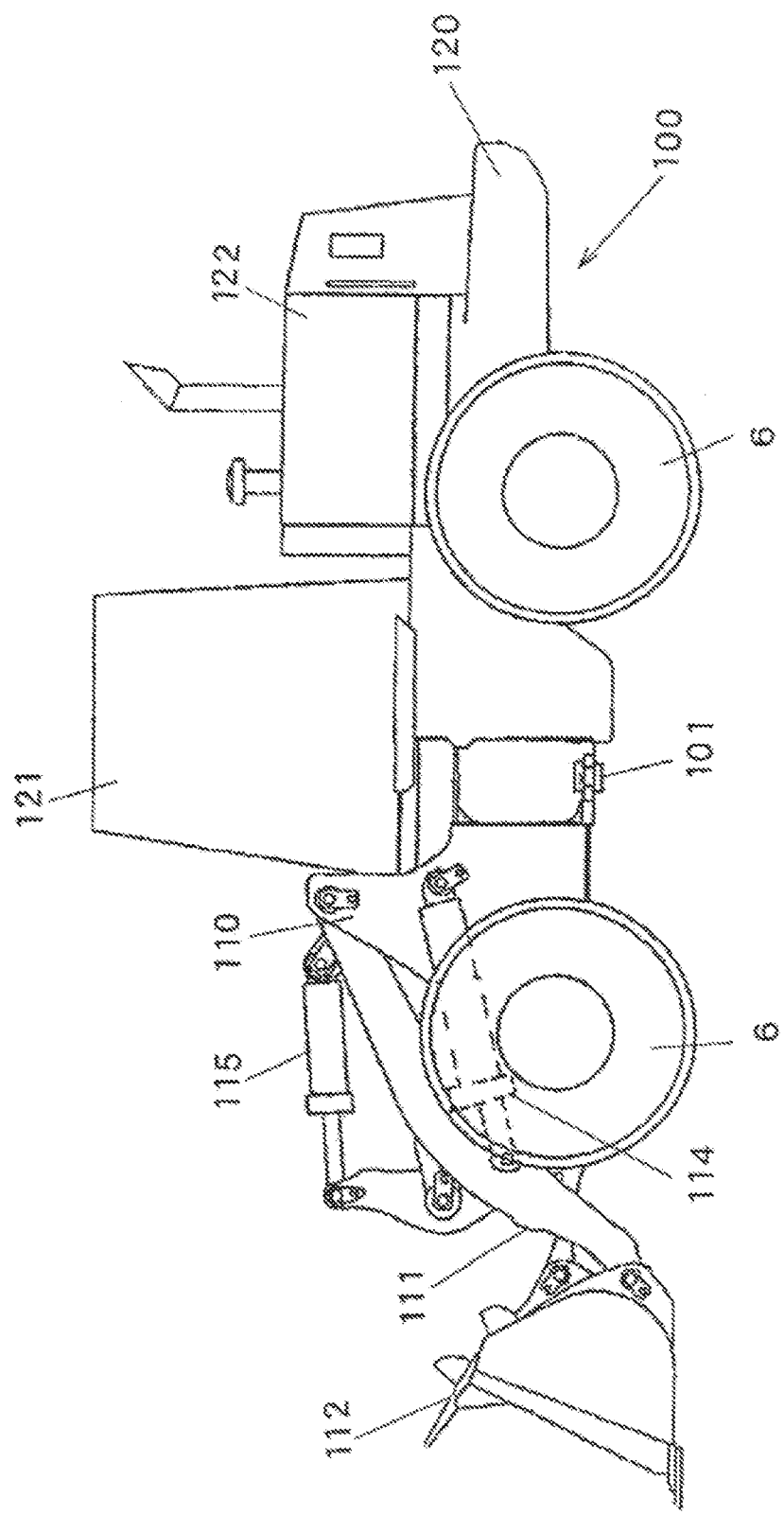
FIG. 1 is an external view of a construction vehicle.

FIG. 1 is a side view of a wheel loader which is an example work vehicle to which a prime mover control device in accordance with the embodiment is applied. The wheel loader 100 consists of a front body 110 having an arm 111, a bucket 112, tires 6 and/or the like, and a rear body 120 having a cab 121, an engine compartment 122, tires 6 and/or the like. The front body 110 and the rear body 120 are rotatably coupled to each other through a center pin 101, so that the front body 110 is bent from side to side relative to the rear body 120 through the extension and contraction of a steering cylinder (not shown). The bucket 112 is raised/lowered by a lift arm cylinder 114, and rotated by a bucket cylinder 115.

Figure 2:
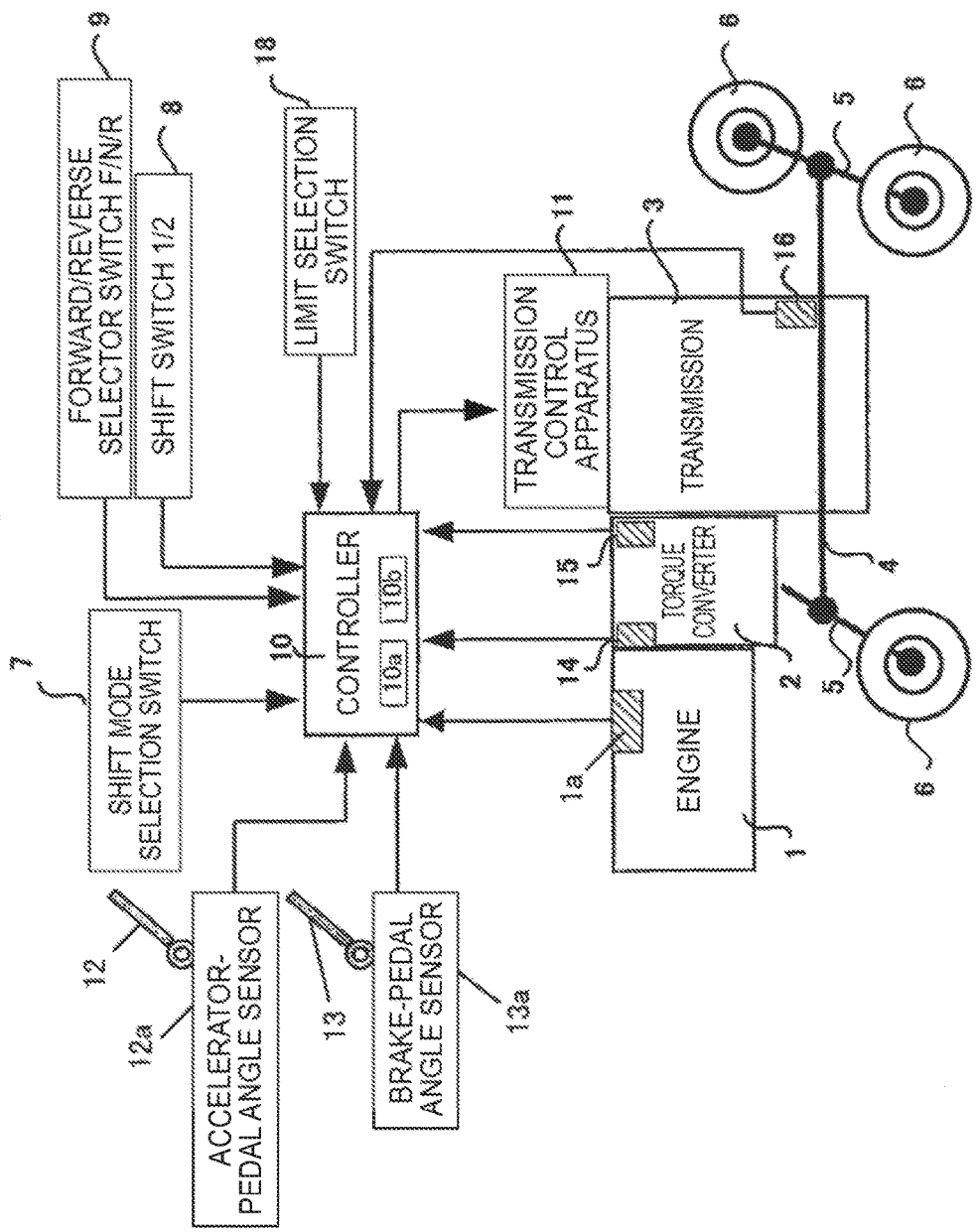
FIG. 2 is a block diagram of a construction vehicle.

FIG. 2 is a block diagram related to speed control and shift control for the wheel loader 100. The wheel loader 100 is equipped with: a controller 10 that plays a central role for the control; an engine 1 of which rotational speed is controlled by the controller 10; a torque converter 2 that transfer the power of the engine 1 to a transmission 3; the transmission 3 that changes the speed of output of the torque converter 2; a transmission control apparatus 11 that controls the gear stages of the transmission 3; and axles 5 and a propeller shaft 4 that use the output from the transmission 3 to provide a drive force to the tires 6. The controller 10 is connected via signal lines to: an accelerator-pedal angle sensor 12a that detects a depression angle of an accelerator pedal 12; a brake-pedal angle sensor 13a that detects a depression angle of a brake pedal 13; a shift mode selection switch 7 for switching between an automatic shift and a manual shift; a forward/reverse selector switch 9; a shift switch 8; a limit selection switch 18 for switching between presence and absence of limits of the rotational speed of the engine 1; an engine rotational speed sensor 1a; a torque-converter input-shaft rotational speed sensor 14; a torque-converter output-shaft rotational speed sensor 15; and a vehicle speed sensor 16, a signal from each of these devices is inputted to the controller 10.

The controller 10 includes CPU, ROM, flash memory and RAM. The ROM stores a mode decision program 10*a*, rotational-speed decision program 10*b*, and a limit mode to be rewritten as the need arises by the mode decision program 10*a*. The limit mode is any of modes A to C, in which immediately after startup of the controller 10 the limit mode is set to be mode A. The controller 10 executes the mode decision program 10*a* and the rotational-speed decision program 10*b* at time intervals, for example, every a second, to control the rotational speed of the engine 1.

The mode decision program 10*a* reads output of the torque-converter input-shaft rotational speed sensor 14, output of the torque-converter output-shaft rotational speed sensor 15, and/or the like for determination of the operation state of the wheel loader 100, and therefore decides the limit mode to be any of modes A to C and then writes the decided mode into RAM of the controller 10.

The rotational-speed decision program 10*b* calculates a target rotational speed of the engine 1 using outputs of the accelerator-pedal angle sensor 12*a*, the limit selection switch 18, the torque-converter input-shaft rotational speed sensor 14, and the torque-converter output-shaft rotational speed sensor 15, as well as using the limit mode stored in RAM.

The rotational speed of the engine 1 is controlled by the controller 10, and the engine output is transferred to the torque converter 2. The rotational speed of the engine 1 is measured by the engine rotational speed sensor 1*a*, and the measured value is output to the controller 10.

The torque converter 2 is a fluid clutch including an impeller, a turbine and a stator. The rotation of the engine 1 is transmitted via the torque converter 2 to the transmission 3. The torque converter 2 has the function of increasing the output torque with respect to the input torque. A torque-converter speed ratio e (=Nt/Ni), which refers to a ratio between an input-shaft rotational speed Ni and an output-shaft rotational speed Nt of the torque converter 2, takes on values from zero to one, indicating that the lower the torque-converter speed ratio, the more the torque is increased. The torque-converter speed ratio also represents the magnitude of load. If the traveling load increases due to, for example, the wheel loader 100 commencing to move uphill when the engine speed is constant, or the like, the output rotational speed, i. e. vehicle speed, is reduced, so that the torque-converter speed ratio is reduced.

Detection signals output from the torque-converter input-shaft rotational speed sensor 14 measuring an input-shaft rotational speed Ni and the torque-converter output-shaft rotational speed sensor 15 measuring an output-shaft rotational speed Nt are outputted to the controller 10.

The transmission 3 is an automatic transmission having solenoid vales corresponding to respective gear stages, which changes the speed of the output of the torque converter 2 to be transferred to the propeller shaft 4. The solenoid valves are driven by the transmission control apparatus 11 so that the gear stage is changed between gears such as first, second and reverse gears.

The propeller shaft 4 transfers the output of the transmission 3 to the tires 6 via the axles 5 to allow the wheel loader 100 to travel. The rotational speed of the propeller shaft 4, or the vehicle speed, is measured by the vehicle-speed sensor 16, which is then output to the controller 10.

The accelerator pedal 12 is operated by the operator, of which the amount of pedal depression is measured by the accelerator-pedal angle sensor 12*a*, which is then output to the controller 10.

The forward/reverse selector switch 9 is operated by the operator, from which a change of the direction of travel of the wheel loader 100 is transmitted to the controller 10.

The shift switch 8 is operated by the operator, from which an instruction for changing the gear stage of the transmission 3 provided by the operator is transmitted to the transmission control apparatus 11 via the controller 10.

The shift mode selection switch 7 is operated to the "automatic" or "manual" position by the operator, informing the controller 10 which of the controller 10 or the shift switch 8 will operate changing of the gear stage or the transmission 3.

The limit selection switch 18 is operated to the "normal operation" or "limiting operation" position by the operator, informing the controller 10 whether or not the rotational speed of the engine 1 is limited. The controller 10 controls the engine speed in accordance with a depression angle detected by the accelerator-pedal angle sensor 12*a*. If the limit selection switch 18 outputs the "limiting operation", the maximum rotational speed calculated by the rotational-speed decision program 10*b* is set as an upper limit.

The transmission control apparatus 11 changes the gear stage of the transmission 3 on the basis of the control instruction received from the controller 10.

(Shift Control)

When the operator sets the shift mode selection switch 7 to the "automatic" position, the gear stage of the transmission 3 is controlled on the basis of the operation state of the wheel loader 100 by the controller 10. There are a method using torque-converter speed ratios and a method using vehicle speeds for the gear stage control. The embodiment employs torque-converter speed ratios as follows.

Figure 3:
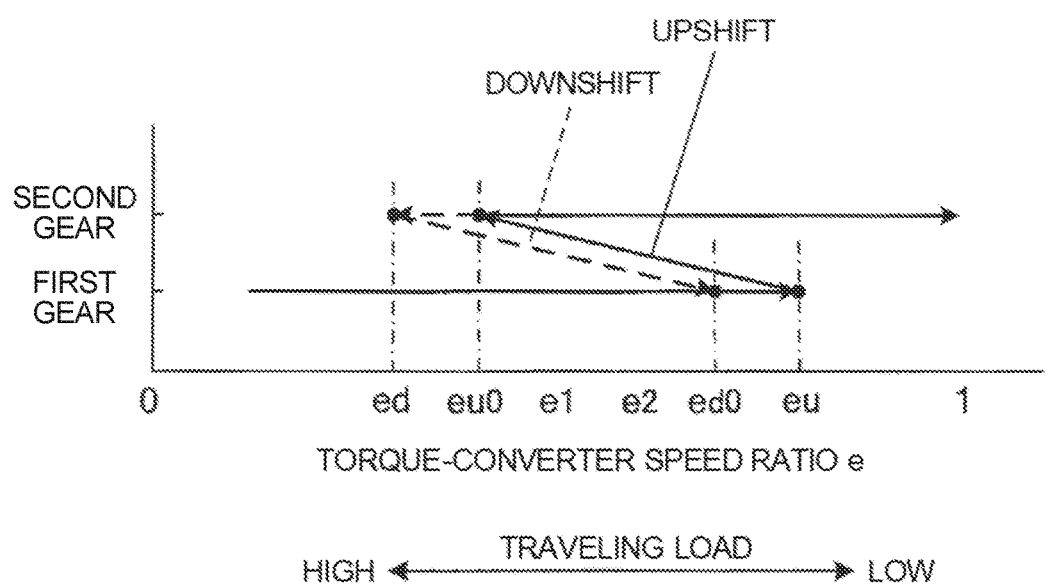
FIG. 3 is a chart showing the shift control using a torque-converter speed ratio.

FIG. 3 is a schematic chart describing the shift control performed by the controller 10. The horizontal axis of FIG. 3 represents the torque-converter speed ratio e and the vertical axis represents the gear stage. The higher the gear stage, the faster the operation is enabled. However, a higher gear stage reduces the torque, causing a risk of being unable to provide a required drive force. To avoid this, in the gear stage being first gear, when the torque-converter speed ratio reaches a predetermined value eu, e.g., 0.8, the gear stage is changed up to second gear. Because a higher gear stage reduces the torque, the torque-converter speed ratio is reduced to eu0, e.g., 0.35. In the gear stage being second gear, when the torque-converter speed ratio is reduced to a predetermined value ed, e.g., 0.3, the gear stage is changed down to first gear. A lower gear stage increases the torque, and therefore the torque-converter speed ratio is increased to ed0, e.g., 0.75.

To prevent occurrence of a shift hunting phenomenon, the value eu and the value ed are set such that the difference between the torque-converter speed ratio immediately after the gear stage is changed up, that is, eu0, and a predetermined torque-converter speed ratio ed serving as a reference for changing down the gear stage is not too small.

(Limit of Maximum Rotational Speed)

When the operator sets the limit selection switch 18 to the "limiting operation" position, the rotational speed of the engine 1 is limited based on the operation state of the wheel loader 100 as follows. The rotational-speed decision program 10*b* determines a maximum rotational speed of the engine 1 (hereinafter referred to as a "maximum rotational speed") from a torque-converter speed ratio calculated from outputs of the torque-converter input-shaft rotational speed sensor 14 and the toque-converter output-shaft rotational speed sensor 15, and from the limit mode stored in the RAM of the controller 10, as explained hereafter.

The engine speed shown below has the relationship of $R4<R3<R2<R1$, and the torque-converter speed ratio has the relationship of $0<e1<e2<e23<e3<1$. Note that, ed and eu shown in FIG. 3 have the relationship of $ed<e1<e2<eu$. A preset $e1 \le e<e2$ range of the torque-converter speed ratio e corresponds to the situation in which the wheel loader 100 moves uphill, or the like. A $0 \le e<e1$ range of the torque-converter speed ratio e, which is lower than the preset speed ratio range ($e1 \le e<e2$), corresponds to the situation in which the wheel loader 100 is operated for excavation work, dozing work, or the like. An $e3 \le e<1$ range of the torque-converter speed ratio e, which is higher than the preset speed ratio range ($e1 \le e<e2$), corresponds to the situation in which the wheel loader 100 travels along a level road at high speeds, or the like.

FIGS. 4A-4D are diagrams showing the relationship between the torque-converter speed ratio and the maximum rotational speed when the limit selection switch 18 is set to the "limiting operation" position, in which 4A shows mode A, 4B shows mode B, 4C shows mode C and 4D shows correlation of each mode. In all of FIG. 4A to FIG. 4B, the horizontal axis represents the torque-converter speed ratio and the vertical axis represents the maximum rotational speed.

Figure 4A:
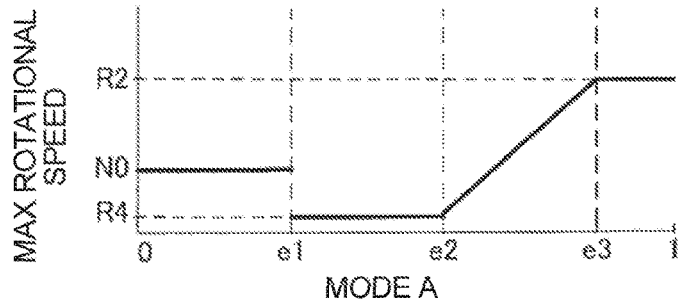
FIG. 4A is a first diagram showing maximum engine rotational speeds on mode basis when the rotational speed is limited.

In mode A as shown in FIG. 4A, in the $0 \le e<e1$ range of the torque-converter speed ratio e, the maximum rotational speed is constant at N0. In the $e1 \le e<e2$ range of the torque-converter speed ratio e, the maximum rotational speed is constant at R4. In the $e2 \le e<e3$ range of the torque-converter speed ratio e, the maximum rotational speed increases from R4 to R2 as the torque-converter speed ratio increases. In the $e3 \le e<1$ range of the torque-converter speed ratio e, the maximum rotational speed is constant at R2. In this manner, in the rotational-speed decision program 10*b* which will be described later, when the torque-converter speed ratio e is within the preset $e1 \le e<e2$ range, the maximum rotational speed R4 of the engine 1 is set to be limited to be low as compared with the maximum rotational speed N0 of the engine 1 when a torque-converter speed ratio e lower than the preset speed ratio range ($e1 \le e<e2$) is within the $0 \le e<e1$ range, and also with the maximum rotational speed R2 of the engine 1 when a torque-converter speed ratio e higher than the preset speed ratio range ($e1 \le e<e2$) is within the $e3 \le e<1$ range. Since the rotational speed N0 is adjusted in accordance with the individual characteristics of the wheel loader 100, the magnitude relationship between R3 and R4 varies from individual to individual. The maximum rotational speed is constant in the $e3 \le e$ range. This is in order to prevent the rotational speed of the engine 1 from being varied by a slight change of load during traveling with a uniform speed at high speeds.

Figure 4B:
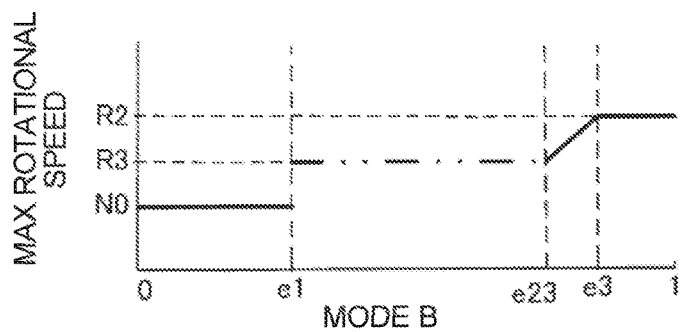
FIG. 4B is a second diagram showing maximum engine rotational speeds on mode basis when the rotational speed is limited.

In mode B as shown in FIG. 4B, in the $0 \le e<e1$ range of the torque-converter speed ratio e, the maximum rotational speed is constant at N0. In the $e1 \le e<e23$ range of the torque-converter speed ratio e, the maximum rotational speed is constant at R3. In the $e23 \le e<e3$ range of the torque-converter speed ratio e, the maximum rotational speed increases from R3 to R2 as the torque-converter speed ratio increases. In the $e3 \le e<1$ range of the torque-converter speed ratio e, the maximum rotational speed is constant at R2.

Figure 4C:
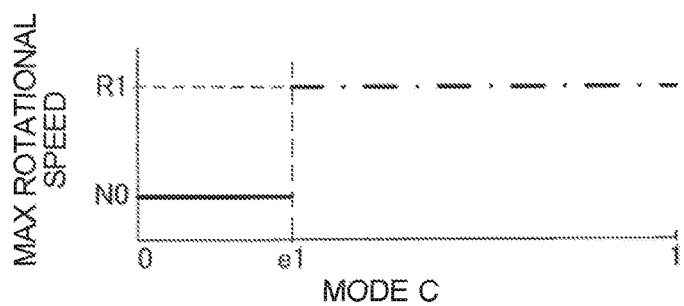
FIG. 4C is a third diagram showing maximum engine rotational speeds on mode basis when the rotational speed is limited.

In mode C as shown in FIG. 4C, in the $0 \le e<e1$ range of the torque-converter speed ratio e, the maximum rotational speed is constant at N0. In the $e1 \le e<1$ range of the torque-converter speed ratio e, the maximum rotational speed is constant at R1.

Figure 4D:
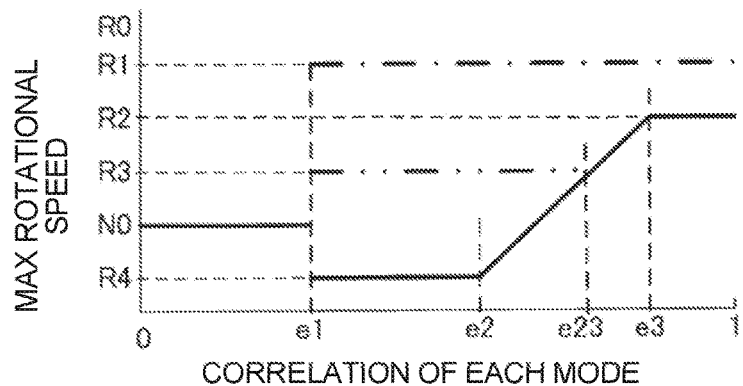
FIG. 4D is a fourth diagram showing maximum engine rotational speeds on mode basis when the rotational speed is limited.

FIG. 4D shows correlation of each mode, in which a solid line shows the characteristics of mode A and common to both mode A and other modes, a dash-dot-dot line shows the characteristics of mode B alone, and a dash-dot line shows the characteristics of mode C alone. In the $0 \le e<e1$ range of the torque-converter speed ratio e, the maximum rotational speed is constant at N0 irrespective of mode. In the $e1 \le e<e23$ range of the torque-converter speed ratio e, the maximum rotational speed in mode B is higher than the maximum rotational speed in mode A, and also the maximum rotational speed in mode C is higher than the maximum rotational speed in mode B. At $e=e23$, the maximum rotational speeds in mode A and mode B become equal to each other at R3. In the $e23 \le e$ range of the torque-converter speed ratio e, the maximum rotational speeds in mode A and mode B are the same and the maximum rotational speed in mode C is higher than those in mode A and mode B. It is noted that, when the limit selection switch 18 is set to the "normal operation" position, the maximum rotational speed is set at R0 higher than R1 irrespective of a torque-converter speed ratio.

Note that, a torque-converter speed ratio e4 has the $e3<e4$ relationship and used when mode is changed, which has still not been touched on.

(Example Operation)

Figure 5:
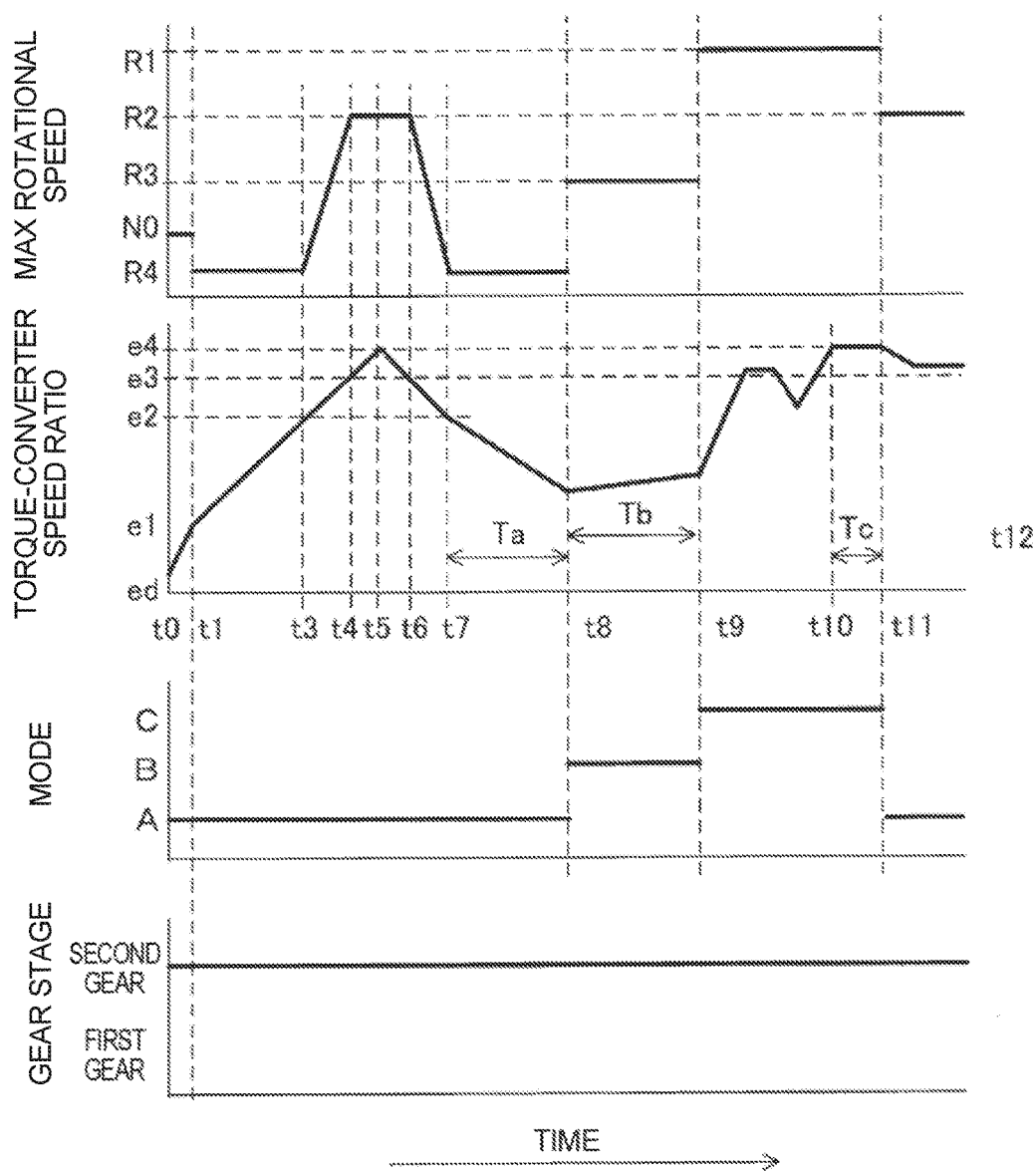
FIG. 5 is a time-line chart showing an example operation.

Reference is made to FIG. 5 for a description of transition of the maximum rotational speed, torque-converter speed ratio, mode and the gear stage when the limit selection switch 18 is in the "limiting operation" position, and the shift mode selection switch 7 is in the "automatic" position. The horizontal axis in each graph represents a lapse of time, and times shown by vertical dotted lines are aligned in all graphs.

At time t0, the wheel loader 100 operates in a torque-converter speed ratio satisfying $ed<e<e1$, in second gear of the gear stage and in mode A of the limit mode. Because the torque-converter speed ratio is lower than e1, the controller 10 sets the maximum rotational speed to N0.

After that, the torque-converter speed ratio of the wheel loader 100 increases, and then when the torque-converter speed ratio becomes equal to or higher than e1 at time t1, the controller 10 sets the maximum rotational speed to R4. The torque-converter speed ratio becomes equal to or higher than e2 at time t3, so that the maximum rotational speed increases from time t3 on. The torque-converter speed ratio reaches e3 at time t4, so that the controller 10 sets the maximum rotational speed to R2 which is the highest rotational speed in mode A. Although the torque-converter speed ratio increases from time t4 on, the maximum rotational speed is constant at R2.

Upon the wheel loader 100 commencing to move uphill at time t5, the traveling load increases, causing the torque-converter speed ratio to start to decrease. Upon the torque-converter speed ratio becoming lower than e3 from time t6, the controller 10 changes the maximum rotational speed from R2 to lower values in sequence. Upon the torque-converter speed ratio becoming lower than e2 at time t7, the maximum rotational speed is set to R4.

After the maximum rotational speed has been set to R4, the state in which the torque-converter speed ratio is equal to or higher than e1 and also lower than e2 is maintained over a predetermined time period Ta. Then, at time t8 after the lapse of the time period Ta from time t7, the controller 10 changes the limit mode from mode A to mode B. In step with this, the maximum rotational speed is changed to R3.

After the maximum rotational speed has been set to R3, the state in which the torque-converter speed ratio is equal to or higher than e1 and also lower than e2 is maintained over a predetermined time period Tb. Then, at time t9 after the lapse of the time period Tb from time t8, the controller 10 changes the limit mode from mode B to mode C. In step with this, the maximum rotational speed is changed to R1.

From time t9 on, the torque-converter speed ratio repeatedly increases and decreases, but the maximum rotational speed is not changed from R1 because mode C remains.

At time t10, after the torque-converter speed ratio has reached e4, the state in which the torque-converter speed ratio is maintained at equal to or higher than e4 is maintained until the lapse of a predetermined time period Tc. Then, at time t11 after the lapse of the time period Tc from time t10, the controller 10 changes the mode from C to A. In step with this, the maximum rotational speed is changed to R2. From time t11 on, the maximum rotational speed is not changed from R2 because the torque-converter speed ratio is higher than e3 and lower than e4.

As described above, when the limit selection switch 18 is in the "limiting operation" position, the controller 10 uses the limit mode stored in the RAM and the torque-converter speed ratio to determine a maximum rotational speed. The relationship between the torque-converter speed ratio and the maximum rotational speed for each mode is shown in FIGS. 4A-4D. In mode A, when the operation state in which the torque-converter speed ratio e is e1≤e<e2 is maintained over the predetermined time period Ta, the controller 10 changes the mode from A to B, and, in step with this, changes the maximum rotational speed from R4 to R3. In other words, from the fact that the state of low torque-converter speed ratios continues over the predetermined time period, the controller 10 determines that the engine output is insufficient due to a high traveling load, and thus raises the maximum rotational speed to increase the output of the engine 1. Further, in mode B, when the operation state in which the torque-converter speed ratio e is e1≤e<e2 is maintained over the predetermined time period Tb, the controller 10 changes the mode from B to C, and, in step with this, changes the maximum rotational speed from R3 to R1. In other words, when the state of low torque-converter speed ratios continues, the controller 10 changes the mode from A to B and from B to C and raises the maximum rotational speed to increase the output of the engine 1, so that the job is completed in a short time.

(Mode Decision Program)

Figure 6:
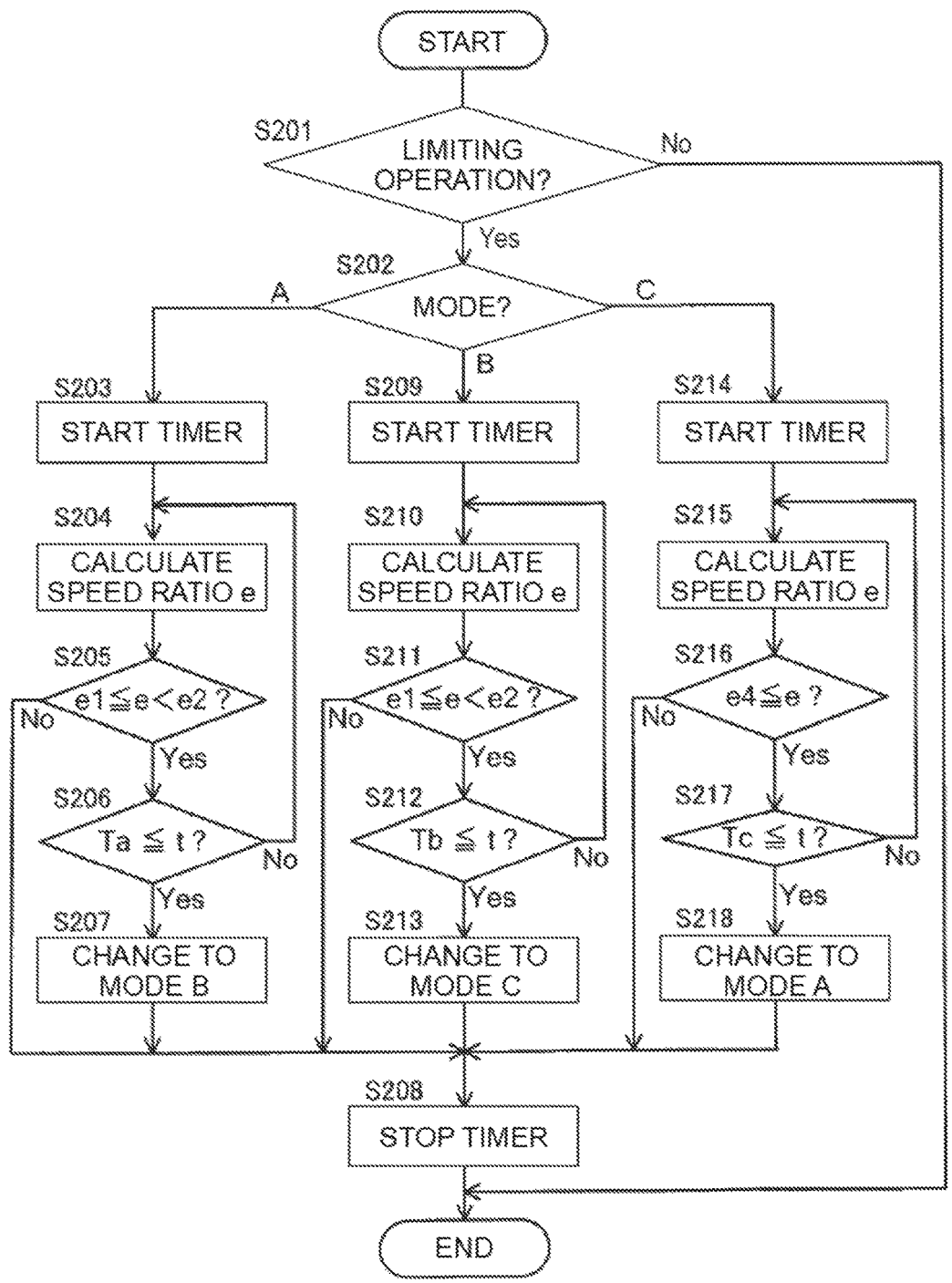
FIG. 6 is a flowchart showing the operation of a mode decision program.

Reference is made to FIG. 6 for a description of the operation of the mode decision program 10a. The mode decision program 10a is for a decision on a limit mode required for calculation of a target rotational speed of the engine 1. The mode decision program 10a is stored in the ROM of the controller 10 and is developed in the RAM of the controller 10 to be executed by CPU at predetermined time intervals, for example, every one second. The substance that executes each of the steps below is the CPU of the controller 10.

At step S201, the controller 10 reads a state of the limit selection switch 18 operated by the operator, and then determines whether or not the "limiting operation" is set. If determining that the "limiting operation" is set, the controller 10 proceeds to step S202. If determining that the "limiting operation" is not set, that is, that the "normal operation" is set, the controller 10 terminates the program of which the operation is described in FIG. 6.

At step S202, the controller 10 reads a current mode stored in the RAM to determine which mode is stored. When mode A is determined, the controller 10 proceeds to step S203. When mode B is determined, the controller 10 proceeds to step S209. When mode C is determined, the controller 10 proceeds to step S214.

At step S203, the controller 10 causes a timer to start to count, and then proceeds to step S204.

At step S204, the controller 10 reads output of the torque-converter input-shaft rotational speed sensor 14 and output of the torque-converter output-shaft rotational speed sensor 15 to calculate a torque-converter speed ratio, and then proceeds to step S205.

At step S205, the controller 10 determines whether or not the torque-converter speed ratio e calculated in step S204 satisfies e1≤e<e2. When determining that e1≤e<e2 is satisfied, the controller 10 proceeds to step S206. At step S206, the controller 10 determines whether or not a time period Ta, e.g., three seconds or longer, has elapsed from when the timer t has started to count at step S203. When determining that the time period Ta or longer has elapsed, the controller 10 proceeds to step S207. At step S207, the controller 10 changes the limit mode stored in the RAM from mode A to mode B, and then proceeds to step S208. At step S208, the controller 10 stops the time count started at step S203, S209 or S14, and terminates the program of which the operation is described in the flowchart in FIG. 6.

At step S205, when determining that the torque-converter speed ratio e does not satisfy e1≤e<e2, the controller 10 stops the timer at step S208 and terminates the program of which the operation is described in the flowchart in FIG. 6.

At step S206, when determining that the time counted from step S203 by the timer t is shorter than a time period Ta, the controller 10 returns to step S204.

Steps S209 to S213 and steps S214 to 218 are steps respectively executed when it is determined at step S202 that the limit mode is mode B and mode C, in which the processing in these steps is similar to the processing in step S203 to S207. The following is a description of the differences.

Step S212 differs in that the threshold value in step S206 is changed to Tb. Step S213 differs in that the limit mode is changed from mode B to mode C. Step S216 differs from step S205 in that a determination is made whether or not the torque-converter speed ratio e is equal to or higher than e4. Step S217 differs in that the threshold value in step S206 is changed to Tc. Step S218 differs in that the limit mode is changed from mode C to mode A.

(Rotational-Speed Decision Program)

Figure 7:
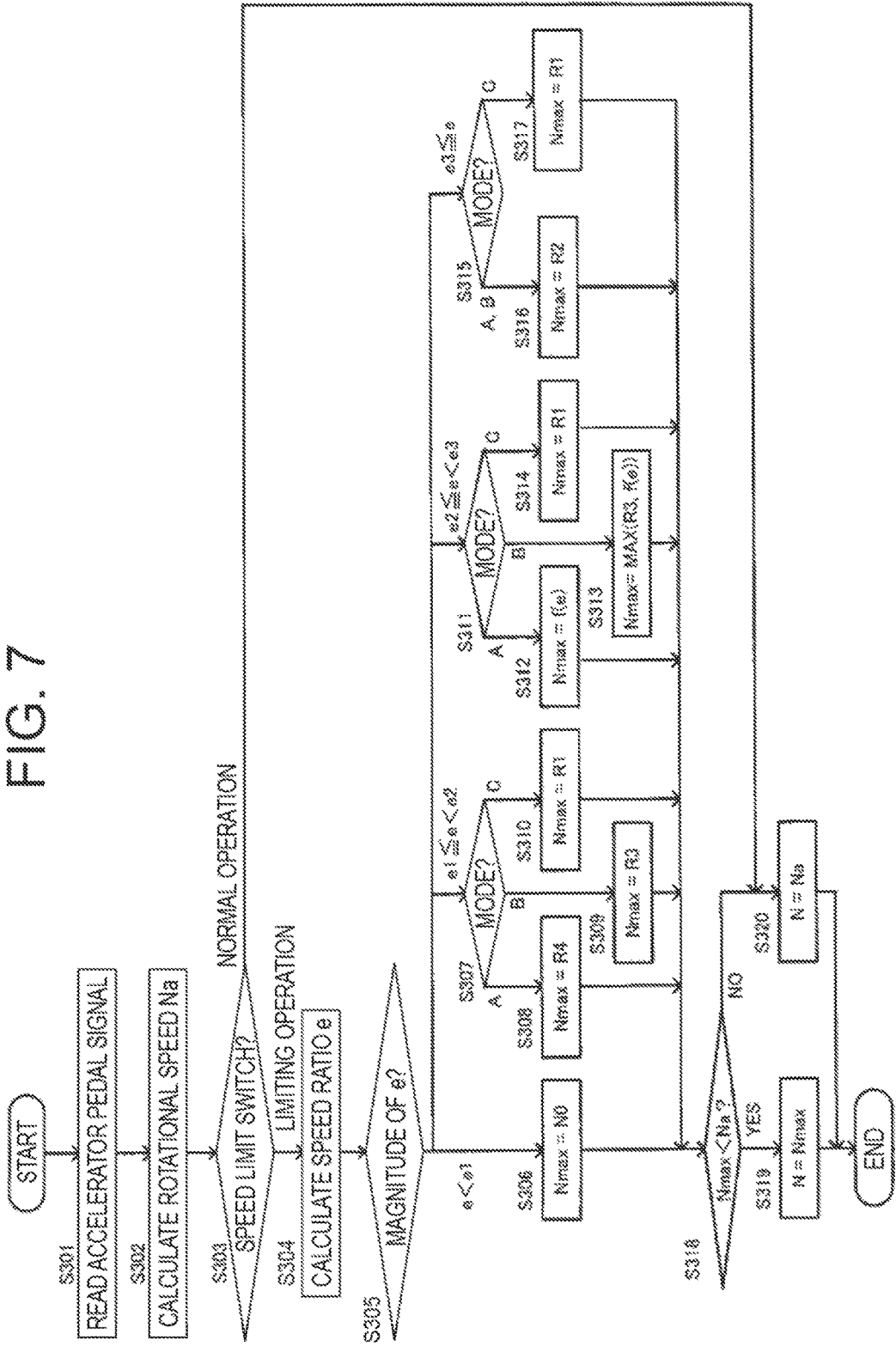
FIG. 7 is a flowchart showing the operation of a rotational-speed decision program.

Reference is made to FIG. 7 for a description of the operation of the rotational-speed decision program 10b for calculation of a target rotational speed of the engine 1. The rotational-speed decision program 10b is stored in the ROM of the controller 10 and is developed in the RAM of the controller 10 to be executed by CPU at predetermined time intervals, for example, every one second. Each of the steps described below is executed by the CPU of the controller 10.

At step S301, the controller 10 reads output of the accelerator-pedal angle sensor 12a and then proceeds to step S302.

At step S302, the controller 10 calculates a target rotational speed Na of the engine 1 from the output of the accelerator-pedal angle sensor 12a, and then proceeds to step S303. For example, when the output of the accelerator-pedal angle sensor 12a is minimum, Na is a preset idle rotational speed, but when it is maximum, Na is R0. However, R0 is a maximum rotational speed set when the limit selection switch 18 is set to the "normal operation" position as previously described.

At step S303, the controller 10 reads output of the limit selection switch 18 operated by the operator to determine which the "normal operation" or the "limiting operation" is selected. When the "limiting operation" is determined, the controller 10 proceeds to step S304, but when the "normal operation" is determined, the controller 10 proceeds to step S320.

At step S304, the controller 10 reads output of the torque-converter input-shaft rotational speed sensor 14 and output of the torque-converter output-shaft rotational speed sensor 15 to calculate a torque-converter speed ratio, and then proceeds to step S305.

At step S305, the controller 10 evaluates the magnitude of the torque-converter speed ratio calculated in step S304. When it is determined to be lower than e1, the controller 10 proceeds to step S306. When it is determined to be equal to or higher than e1 and also lower than e2, the controller 10 proceeds to step S307. When it is determined to be equal to or higher than e2 and also lower than e3, the controller 10 proceeds to step S311. When it is determined to be equal to or higher than e3, the controller 10 proceeds to step S315. For example, e1 to e4 are taken as 0.4, 0.7, 0.9 and 0.95.

At step S306, the controller 10 assigns a predetermined constant N0 to a variable Nmax, and then proceeds to step S318.

At step S307 following the determination that the torque-converter speed ratio is equal to or higher than e1 and also lower than e2, the controller 10 reads a limit mode stored in the RAM to determine which of limit modes is stored. When the limit mode is determined to be mode A, the controller 10 proceeds to step S308. When it is determined to be mode B, the controller 10 proceeds to step S309. When it is determined to be mode C, the controller 10 proceeds to step S310.

At step S308, the controller 10 assigns a predetermined constant R4 to a variable Nmax, and then proceeds to step S318. At step S309, the controller 10 assigns a predetermined constant R3 to a variable Nmax, and then proceeds to step S318. At step S310, the controller 10 assigns a predetermined constant R1 to a variable Nmax, and then proceeds to step S318.

At step S311 following the determination that the torque-converter speed ratio is equal to or higher than e2 and also lower than e3, the controller 10 reads a limit mode stored in the RAM to determine which of limit modes is stored. When the limit mode is determined to be mode A, the controller 10 proceeds to step S312. When it is determined to be mode B, the controller 10 proceeds to step S313. When it is determined to be mode C, the controller 10 proceeds to step S314.

At step S312, the controller 10 assigns the result of a calculation of function f(e) to a variable Nmax, and then proceeds to step S318. Note that, function f(e) is an equation representing a line connecting (e2, R4) and (e3, R2) in a two-dimensional plane. At step S313, the controller 10 assigns the higher of the two, R3 and f(e), to a variable Nmax, and then proceeds to step S318. At step S314, the controller 10 assigns a predetermined constant R1 to a variable Nmax, and then proceeds to step S318.

At step S315 following the determination that the torque-converter speed ratio is equal to or higher than e3, the controller 10 reads a mode stored in the RAM to determine which of limit modes is stored. When the limit mode is determined to be mode A or B, the controller 10 proceeds to step S316. When it is determined to be mode C, the controller 10 proceeds to step S317.

At step S316, the controller 10 assigns a predetermined constant R2 to a variable Nmax, and then proceeds to step S318. At step S317, the controller 10 assigns a predetermined constant R1 to a variable Nmax, and then proceeds to step S318.

At step S318, the controller 10 determines whether or not the target rotational speed Na calculated in step S302 exceeds Nmax assigned the value in each step S306 to S317. When Na is determined to exceed Nmax, the controller 10 proceeds to step S319. When Nmax is determined to be equal to or lower than Na, the controller 10 proceeds to step S320.

At step S319, the controller 10 assigns Nmax to a target rotational speed N of the engine 1, and then terminates the program of which the operation is described in FIG. 7.

At step S320, the controller 10 assigns Na to a target rotational speed N of the engine 1, and then terminates the program of which the operation is described in FIG. 7.

(Outline of Operation)

The mode decision program 10a executed by the controller 10 calculates a torque-converter speed ratio, and determines one of modes A to C as the limit mode, which is then stored in the RAM. The limit of the maximum rotational speed is relaxed more in mode B than in mode A, and the limit of the maximum rotational speed is relaxed more in mode C than in mode B. When the limit mode is set to mode A, when the state in which the torque-converter speed ratio satisfies e1≤e<e2 is maintained over a predetermined time period Ta or longer, the limit mode is changed to mode B. When the limit mode is set to mode B, when the state in which the torque-converter speed ratio satisfies e1≤e<e2 is maintained over a predetermined time period Tb or longer, the limit mode is changed to mode C.

The rotational-speed decision program 10b executed by the controller 10 limits the maximum rotational speed of the engine 1 on the basis of the read limit mode and the calculated torque-converter speed ratio. Even if the torque-converter speed ratio is constant, when the limit mode is changed from mode A to mode B or from mode B to mode C, the limit of the rotational speed is relaxed.

That is, when the torque-converter speed ratio e falls within e1≤e<e2 over a predetermined time period or longer, it is determined that the engine output is insufficient in relation to a traveling load, so that the limit of the maximum rotational speed of the engine 1 is relaxed by changing the limit mode.

According to the above-described embodiments, the following advantageous effects are produced.

(1) The controller 10 of the wheel loader 100 includes: a rotational speed control unit that controls a rotational speed of the engine 1 in accordance with the manipulated variable of the accelerator pedal 12 (step S302 in FIG. 7); a speed ratio calculation unit that calculates a speed ratio between the input shaft and the output shaft of the torque converter 2 (step S304 in FIG. 7); and a rotational speed limit unit that limits the maximum rotational speed of the engine 1 (step S319 in FIG. 7). The controller 10 adopts any of the modes A to C, that is, first to third limit states, which are different in characteristics. In mode A, that is, in the first limit state, when an operation state in which the calculated speed ratio of one or lower is equal to or higher than e1 and also lower than e2 is maintained for a predetermined time period or longer, the controller 10 changes mode A to mode B, that is, the second limit state; then, in mode B, when an operation state in which the calculated speed ratio is equal to or higher than e1 and also lower than e2 is maintained for a predetermined time period or longer, the controller 10 changes mode B to mode C, that is, the third limit state; and, in mode C, when an operation state in which the calculated speed ratio is equal to or higher than e4 is maintained for a predetermined time period or longer, the controller 10 changes mode C to mode A (steps S202 to S218 in FIG. 6). In the operation state in which the calculate speed ratio is equal to or higher than e1 and also lower than e2, the maximum rotational speed R3 in mode B is higher than the maximum rotational speed R4 in mode A, and the maximum rotational speed R2 in mode C is higher than the maximum rotational speed R3 in mode B.

The controller 10 in the embodiment allows the wheel loader 100 to travel with keeping mode A as the limit mode without a change and maintaining a higher limit of the rotational speed of the engine 1 because the speed ratio exceeds e2 for a short time, when the traveling load is small. The larger the traveling load, the slower the speed ratio is increased. Therefore, after a lapse of a predetermined time period, the controller 10 changes the limit mode to mode B or mode C to relax the limit of the maximum rotational speed. In other words, since the controller 10 relaxes the limit of the maximum rotational speed with the passage of time, the controller 10 is able to set a maximum rotational speed suitable for a traveling load. Further, the amount of fuel consumption is small as compared with the case where there is no limit of the maximum rotational speed. Also, as compared with the case where there is uniformly significant limit of the maximum rotational speed, the same job, for example, an uphill work, is able to be completed for a shorter time.

(2) In the controller 10, in the operation state in which the calculated speed ratio is equal to or higher than e2, the maximum rotational speed in mode B is equal to or higher than the maximum rotational speed in mode A, and the maximum rotational speed in mode C is equal to or higher than the maximum rotational speed in mode B.

As a result, depending on a limit mode determined when the torque-converter speed ratio e is within the $e1 \le e < e2$ range, the maximum rotational speed is determined even in the range of the torque-converter speed ratio of e2 or higher, so that the maximum rotational speed is not unnecessarily increased. In short, it is possible to set a maximum rotational speed suitable for a traveling load even in the range of the torque-converter speed ratio of e2 or higher.

(3) In the operation state in which at least the calculated speed ratio is equal to or higher than e3, even in the limit state of any of the mode A to C, the controller 10 maintains a constant maximum rotational speed for the engine 1 irrespective of the magnitude of the calculated speed ratio, that is, irrespective of how high the calculated speed ratio is as compared with e3.

As a result, when the speed ratio is higher than e3 and the wheel loader 100 is travelling at high speeds, even if the traveling load somewhat changes due to terrain roughness of a road surface and/or the like, the maximum rotational speed of the engine 1 is capable of being maintained constant.

(4) In the operation state in which the calculated speed ratio is equal to or lower than e1, the controller 10 causes the maximum rotational speed of the engine 1 to change in a continuous manner when the speed ratio is changed in the same mode.

As a result, the operator will never feel a sense of discomfort and unease caused by a sudden rotational-speed change of the engine 1.

(5) The maximum rotational speed of the engine 1 in the operation state in which the speed ratio e is $e1 \le e < e2$ in mode C is higher than the maximum rotational speed of the engine 1 at any speed ratio in mode A.

As a result, the maximum rotation speed of the engine 1 can be greatly relaxed in mode C with a high traveling load, so that the time required for the work is reduced, leading to a reduction in burden on the operator.

(Modification 1)

In the above embodiment, the limit mode is changed only from mode A to mode B, from mode B to mode C and from mode C to mode A, and is not changed from mode B to mode A. However, the change in limit mode is not limited to the above. In mode B of the limit mode, when the state in which the torque-converter speed ratio exceeds a predetermined threshold value is maintained for a predetermined time period or longer, the limit mode may be changed to mode A.

According to the modification 1, the following advantageous effects are produced.

(1) The controller 10 changes mode B to mode A when the operation state in which the calculated speed ratio is equal to or higher than e23 is maintained for a predetermined time period or longer.

A threshold value of the torque-converter speed ratio at which the limit mode is changed from mode B to mode A may be at least higher than e2. In particular, as long as the threshold value is a value equal to or higher than e23, the maximum rotational speed takes continuous values when the limit mode is changed from mode B to mode A, so that the operator will never feel a sense of discomfort at a change in rotational speed of the engine 1.

(Modification 2)

In the aforementioned embodiment, when the shift mode selection switch 7 is set to "automatic" position by the operator, the controller 10 evaluates the magnitude of the torque-converter speed ratio to control the gear stage, but a method of controlling the gear stage is not limited to this.

Figure 8:
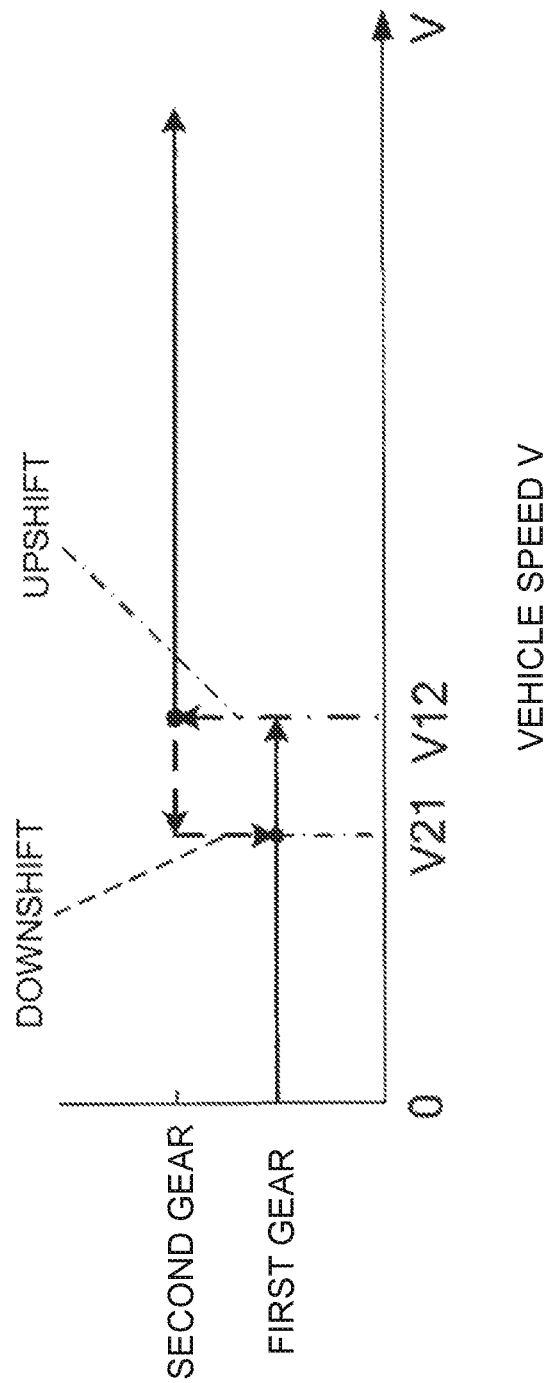
FIG. 8 is a chart showing shift control based on vehicle speed in accordance with modification 2.

The controller 10 may use a vehicle speed measured by the vehicle-speed sensor 16 to control the gear stage. FIG. 8 is a chart describing the operation when the controller 10 uses a vehicle speed to control the gear stage. The horizontal axis of FIG. 8 represents a vehicle speed and the vertical axis represents a gear stage. When the gear stage is set at first gear, when the vehicle speed measured by the vehicle-speed sensor 16 exceeds a predetermined speed V12, the controller 10 transmits an instruction to the transmission control apparatus 11 to change the gear stage to second gear. Then, in second gear, when the vehicle speed measured by the vehicle-speed sensor 16 becomes below a predetermined speed V12, the controller 10 transmits an instruction to the transmission control apparatus 11 to change the gear stage to first gear.

The controller 10 may use both a torque-converter speed ratio and a vehicle speed to control the gear stage. When the torque-converter speed ratio satisfies predetermined requirements and also the vehicle speed satisfies predetermined requirements, the controller 10 may transmit an instruction to the transmission control apparatus 11 to change the gear stage. When the torque-converter speed ratio satisfies predetermined requirements or alternatively the vehicle speed satisfies predetermined requirements, the controller 10 may transmit an instruction to the transmission control apparatus 11 to change the gear stage.

(Modification 3)

The gear stage of the transmission 3 is set to only first gear or second gear in the aforementioned embodiment, but may be capable of being set to third gear or higher. Further, the operation of the rotational-speed decision program 10b of the controller 10 may be modified as shown in FIG. 9.

Figure 9:
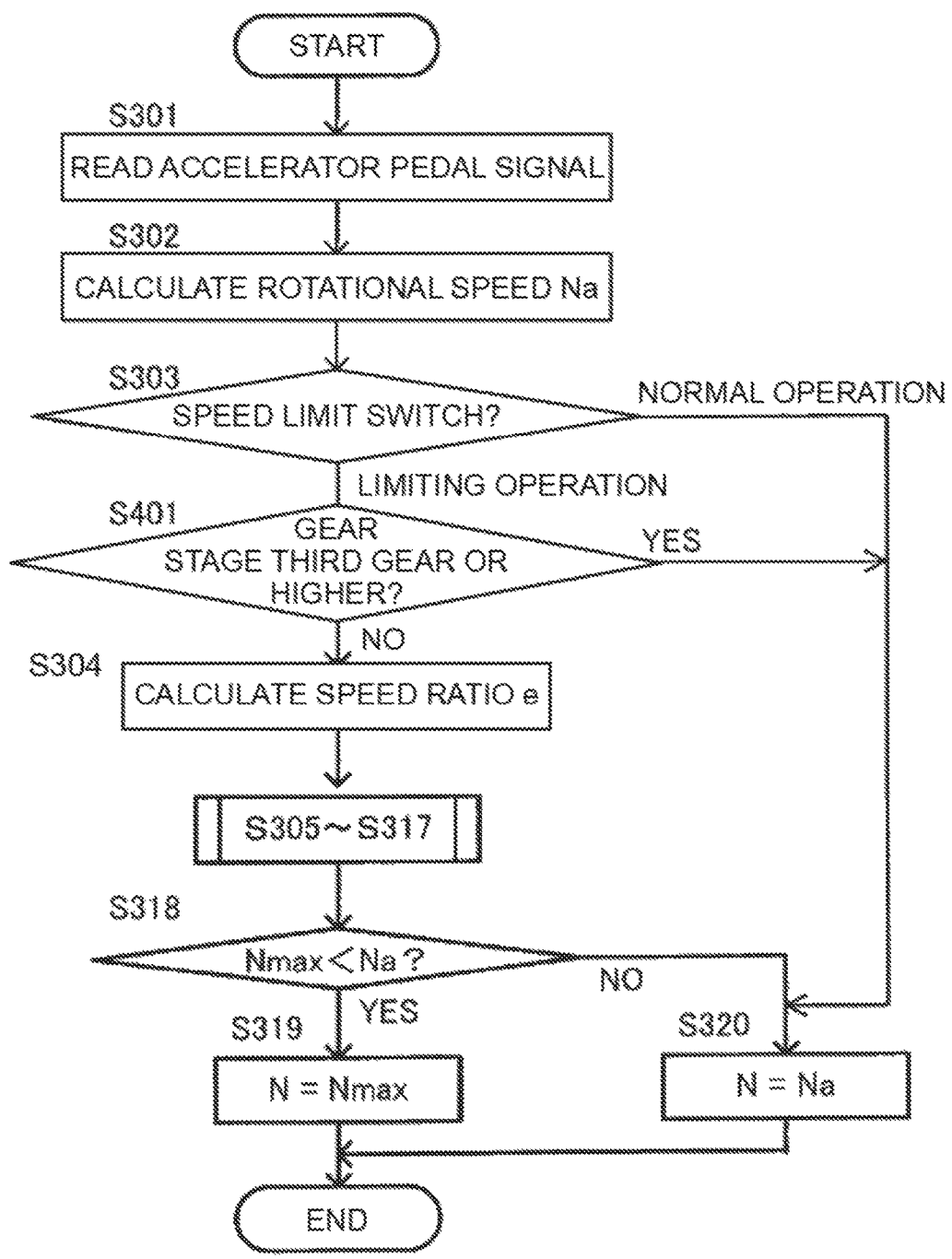
FIG. 9 is a flowchart showing the operation of a rotational speed decision program in accordance with modification 3.

FIG. 9 is a flowchart describing the operation of a program executed by the controller 10 in modification 3, instead of the program of which the operation is described in FIG. 7 in the aforementioned embodiment. The flowchart shown in FIG. 9 differs in a new step S401 being provided between step S303 and step S304 in the flowchart shown in FIG. 7. At step S401, the controller 10 evaluates a current gear stage of the transmission 3. When it is determined that the gear stage is third gear or higher, the controller 10 proceeds to step S320. When it is determined that the gear stage is second gear or lower, the controller 10 proceeds to step S304.

That is, when the gear stage is set at third gear or higher, the limit selection switch 18 may be deemed at all times to be set to the "normal operation" position, and thus the processing may be carried out.

(Modification 4)

Three modes A to C are provided as the limit mode in the aforementioned embodiment, but the number of limit modes is not limited to three. Four limit modes or more may be provided so that when the torque-converter speed ratio e corresponds to e1≤e<e2, the limit mode may be changed every time a predetermined time has elapsed, so as to gradually lower the limit on the maximum rotational speed of the engine 1.

Any of combinations of the aforementioned embodiment and the respective modifications may be possible.

Although various embodiments and modifications have been described, the present invention is not limited to the details described herein. The present invention embraces various other aspects contemplated within the scope of the technical thought of the present invention.

The aforementioned embodiment has described the example in which, when the state in which the speed ratio e is within a preset speed-ratio range (e,g., e1≤e<e2) is maintained, the maximum rotational speed of the engine 1 is changed from R4 to R3, R1 in order. However, the present invention includes an example in which when the state in which the speed ratio e is within a preset speed-ratio range (e,g., e1≤e<e2) is maintained, the maximum rotational speed of the engine 1 is changed from R4 to R3.

The disclosure of the following basic application is herein incorporated as reference.

Japanese Patent Application No. 2014-241570 (filed on Nov. 28, 2014)

LIST OF REFERENCE SIGNS

10 . . . Controller (Prime mover control device)
10a . . . Mode decision program (Rotational speed limit unit)
10b . . . Rotational-speed decision program (Rotational speed control unit, Speed ratio calculation unit, Rotational speed limit unit)
100 . . . Wheel loader (Work vehicle)

The invention claimed is:

1. A prime mover control device of a work vehicle for transferring rotation of a prime mover through a torque converter and a transmission to wheels, comprising:
a controller that is configured to
control a rotational speed of the prime mover in accordance with the manipulated variable of an accelerator pedal;
calculate a speed ratio between an input shaft and an output shaft of the torque converter; and
when a speed ratio falls within a preset speed ratio range, limit a maximum rotational speed of the prime mover to be lower as compared with maximum rotational speeds set when a speed ratio falls within a range higher than the preset speed ratio range and when a speed ratio falls within a range lower than the preset speed ratio range, wherein
when the calculated speed ratio is maintained for a predetermined time in a state within the preset speed ration range, a maximum rotational speed of the prime mover is changed to a higher maximum rotational speed than the limited maximum rotational speed limited to be lower,
the controller has any mode of first to third modes with different characteristics, and
in the first mode in which a maximum rotational speed of the prime mover is set to the maximum rotational speed limited to be lower, when an operation state in which a calculated speed ratio of one or lower is equal to or higher than a first predetermined value and also lower than a second predetermined value which is higher than the first predetermine value is maintained for a predetermined time period or longer, the controller changes the first mode to the second mode in which a maximum rotational speed is set to be high as compared with the maximum rotational speed limited to be lower, and
in the second mode, when an operation state in which a calculated speed ratio of one or lower is equal to or higher than the first predetermined value and also lower than the second predetermined value is maintained for a predetermined time period or longer, the controller changes the second mode to the third mode in which a maximum rotational speed is set to be high as compared with the maximum rotational speed in the second mode.

2. The prime mover control device of a work vehicle according to claim 1,
wherein, in the second mode, when an operation state in which a calculated speed ratio of one or lower is equal to or higher than a fourth predetermined value that is higher than the second predetermined value and also lower than a third predetermined value is maintained for a predetermined time period or longer, the controller changes the second mode to the first mode.

3. The prime mover control device of a work vehicle according to claim 1,
wherein, in the third mode, when an operation state in which a calculated speed ratio of one or lower is equal to or higher than a third predetermined value that is higher than the second predetermined value is maintained for a predetermined time period or longer, the third mode is changed to the first mode.

4. The prime mover control device of a work vehicle according to claim 1, wherein,
in an operation state in which a calculated speed ratio of one or lower is equal to or higher than the second predetermined value, a maximum rotational speed of the prime mover in the second mode is equal to or higher than a maximum rotational speed of the prime mover in the first mode, and a maximum rotational speed of the prime mover in the third mode is higher than a maximum rotational speed of the prime mover in the second mode.

* * * * *